United States Patent
Suresh et al.

(10) Patent No.: US 12,401,289 B2
(45) Date of Patent: Aug. 26, 2025

(54) APPROACH FOR DC TO AC INVERSION

(71) Applicant: SCHNEIDER ELECTRIC IT CORPORATION, Foxboro, MA (US)

(72) Inventors: Anil Cheniveettil Suresh, Kerala (IN); Chandrasekaran Jayaraman, Bangalore (IN); Pradeep Tolakanahalli Nagabhushanrao, Bangalore (IN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 259 days.

(21) Appl. No.: 17/823,676

(22) Filed: Aug. 31, 2022

(65) Prior Publication Data

US 2023/0106209 A1    Apr. 6, 2023

(30) Foreign Application Priority Data

Sep. 28, 2021    (IN) .............................. 202111043888

(51) Int. Cl.
*H02M 3/335*    (2006.01)
*H02M 1/00*    (2007.01)
*H02M 7/5387*    (2007.01)

(52) U.S. Cl.
CPC ....... *H02M 3/33573* (2021.05); *H02M 1/007* (2021.05); *H02M 7/5387* (2013.01)

(58) Field of Classification Search
CPC . H02M 1/007; H02M 3/33573; H02M 7/5387
See application file for complete search history.

(56) References Cited

U.S. PATENT DOCUMENTS

| | | | |
|---|---|---|---|
| 6,654,261 B2 | 11/2003 | Welches et al. |
| 7,787,270 B2 | 8/2010 | NadimpalliRaju et al. |
| 8,698,354 B2 | 4/2014 | Ghosh et al. |
| 10,277,067 B2 | 4/2019 | Mouridsen |
| 2010/0133904 A1 | 6/2010 | Klodowski et al. |
| 2010/0142236 A1 | 6/2010 | Lee et al. |

(Continued)

FOREIGN PATENT DOCUMENTS

| | | |
|---|---|---|
| CN | 102007677 A | 4/2011 |
| GB | 2419968 A | 5/2006 |

(Continued)

OTHER PUBLICATIONS

Extended European Search Report from corresponding European Application No. 22197586.5 dated Feb. 13, 2023.

(Continued)

*Primary Examiner* — Jue Zhang
(74) *Attorney, Agent, or Firm* — Lando & Anastasi, LLP

(57) ABSTRACT

Aspects of the disclosure include a power-conversion system including an input, an output, a DC/DC converter coupled to the input, a DC/AC inverter coupled to the DC/DC converter and coupled to the output, and at least one controller coupled to the DC/DC converter and the DC/AC inverter, the at least one controller being configured to control the DC/DC converter to draw input power from the input and provide converted power to the DC/AC inverter, and control the DC/AC inverter to receive the converted power and provide output power to the output in synchronization with the DC/DC converter drawing the input power from the input.

19 Claims, 13 Drawing Sheets

(56) References Cited

U.S. PATENT DOCUMENTS

| | | | | |
|---|---|---|---|---|
| 2012/0112547 A1* | 5/2012 | Ghosh | ............... | H02J 9/062 |
| | | | | 307/66 |
| 2014/0091718 A1* | 4/2014 | Brinlee | ............ | H05B 45/39 |
| | | | | 363/16 |
| 2015/0256111 A1* | 9/2015 | Forster | ............... | H02P 6/14 |
| | | | | 318/400.27 |
| 2021/0058004 A1 | 2/2021 | Maki et al. | | |
| 2022/0173652 A1* | 6/2022 | Kusama | ......... | H02M 3/33573 |

FOREIGN PATENT DOCUMENTS

| | | |
|---|---|---|
| JP | 5141594 B2 | 2/2013 |
| JP | 6190059 B2 | 8/2017 |
| TW | 201338337 A | 9/2013 |
| TW | I435526 B | 4/2014 |

OTHER PUBLICATIONS

Ramu M. Z. et al.: "A bidirectional inverter with high frequency isolated transformer", Power Engineering Conference, 2003, PECON 2003, Proceedings, National Sangi, Malaysia Dec. 15-16, 2003, Piscataway, NJ, USA, IEEE, Dec. 15, 2003 (Dec. 15, 2003), pp. 71-75, XP010802281, DOI: 10.1109/PECON.2003.1437421 ISBN: 978-0-7803-8208-4.

* cited by examiner

APPROACH FOR DC TO AC INVERSION

CROSS-REFERENCE TO RELATED APPLICATIONS

This application claims priority under 35 U.S.C. § 119 to Indian Application Serial No. 202111043888 titled "A NOVEL APPROACH FOR DC TO AC INVERSION," filed on Sep. 28, 2021, which is hereby incorporated by reference in its entirety.

BACKGROUND

1. Field of the Disclosure

At least one example in accordance with the present disclosure relates generally to power conversion.

2. Discussion of Related Art

Power devices, such as uninterruptible power supplies (UPSs), may include power-conversion components. Power-conversion components may include DC/DC converters and DC/AC inverters. DC/DC converters convert DC power of a first voltage level to DC power of a second voltage level. DC/AC inverters convert DC power to AC power. Some power devices may include a DC/DC converter coupled to, and configured to provide power to, a DC/AC inverter.

SUMMARY

According to at least one aspect of the present disclosure a power-conversion system is provided comprising an input, an output, a DC/DC converter coupled to the input, a DC/AC inverter coupled to the DC/DC converter and coupled to the output, and at least one controller coupled to the DC/DC converter and the DC/AC inverter, the at least one controller being configured to control the DC/DC converter to draw input power from the input and provide converted power to the DC/AC inverter, and control the DC/AC inverter to receive the converted power and provide output power to the output in synchronization with the DC/DC converter drawing the input power from the input.

In some examples, the DC/DC converter includes converter switches coupled to the input, and the DC/AC inverter includes inverter switches coupled to the output. In at least one example, the at least one controller is further configured to control the converter switches to provide power to the inverter switches in synchronization with controlling the inverter switches to draw power from the converter switches. In various examples, the at least one controller is further configured to control at least two converter switches of the converter switches and at least two inverter switches of the inverter switches to be in a closed and conducting position approximately simultaneously.

In some examples, the DC/DC converter includes a transformer having a primary winding coupled to the converter switches and a secondary winding coupled to the inverter switches. In at least one example, the at least one controller is further configured to control at least two converter switches of the converter switches to conduct power from the input to the primary winding, and control at least two inverter switches of the inverter switches to conduct power from the secondary winding to the output. In various examples, the power-conversion system further includes a positive DC bus and a negative DC bus coupled between the DC/DC converter and the DC/AC inverter; and a capacitor coupled between the positive DC bus and the negative DC bus.

In some examples, the at least one controller is further configured to control the DC/AC inverter to receive the converted power directly from the DC/DC converter, bypassing the capacitor. In at least one example, the capacitor has a capacitance of approximately 50 µF or less. In various examples, the power-conversion system includes an output inductor coupled to the capacitor via the DC/AC inverter and coupled to the output. In some examples, the at least one controller is further configured to control the DC/AC inverter to discharge the output inductor to the capacitor. In at least one example, the at least one controller is further configured to control the DC/AC inverter to discharge the capacitor to the output inductor.

According to at least one aspect, a non-transitory computer-readable medium storing thereon sequences of computer-executable instructions for operating a power-conversion system having an input, an output, a DC/DC converter coupled to the input, and a DC/AC inverter coupled to the DC/DC converter and to the output is provided, the sequences of computer-executable instructions including instructions that instruct at least one processor to control the DC/DC converter to draw input power from the input and provide converted power to the DC/AC inverter, and control the DC/AC inverter to receive the converted power and provide output power to the output in synchronization with the DC/DC converter drawing the input power from the input.

In some examples, the DC/DC converter includes at least two converter switches and the DC/AC inverter includes at least two inverter switches, and the instructions further instruct at least one processor to control the at least two converter switches to provide power to the at least two inverter switches in synchronization with controlling the at least two inverter switches to draw power from the at least two converter switches. In at least one example, the instructions further instruct at least one processor to control the at least two converter switches and the at least two inverter switches to be in a closed and conducting position approximately simultaneously.

In various examples, the DC/DC converter includes a transformer having a primary winding and a secondary winding, and controlling the at least two converter switches to provide power to the at least two inverter switches includes controlling the at least two converter switches to provide power to the primary winding, and controlling the two or more inverter switches to receive the converted power and provide output power to the output in synchronization with the DC/DC converter drawing the input power from the input includes controlling the at least two inverter switches to conduct power from the secondary winding to the output.

In some examples, the power-conversion system further includes a positive DC bus and a negative DC bus coupled between the DC/DC converter and the DC/AC inverter, and a capacitor coupled between the positive DC bus and negative DC bus, and the instructions further instruct at least one processor to control the DC/AC inverter to receive the converted power directly from the DC/DC converter, bypassing the capacitor. In at least one example, the power-conversion system further includes a capacitor coupled to the DC/AC inverter and an output inductor coupled to the capacitor via the DC/AC inverter and to the output, and the instructions further instruct at least one processor to control the DC/AC inverter to discharge the output inductor to the capacitor. In various examples, the power-conversion system further includes a capacitor coupled to the DC/AC inverter and an output inductor coupled to the capacitor via the DC/AC inverter and to the output, and the instructions further instruct at least one processor to control the DC/AC inverter to discharge the capacitor to the output inductor.

According to at least one aspect of the disclosure, a method of assembling a power-conversion system is provided, the method comprising providing a power converter having a DC/DC converter, a DC/AC inverter, and at least one controller, coupling the DC/DC converter to the DC/AC inverter, and coupling the at least one controller to the DC/DC converter and to the DC/AC inverter, the at least one controller being configured to control the DC/DC converter to provide power to the DC/AC inverter in synchronization with the DC/AC inverter drawing power from the DC/DC converter.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
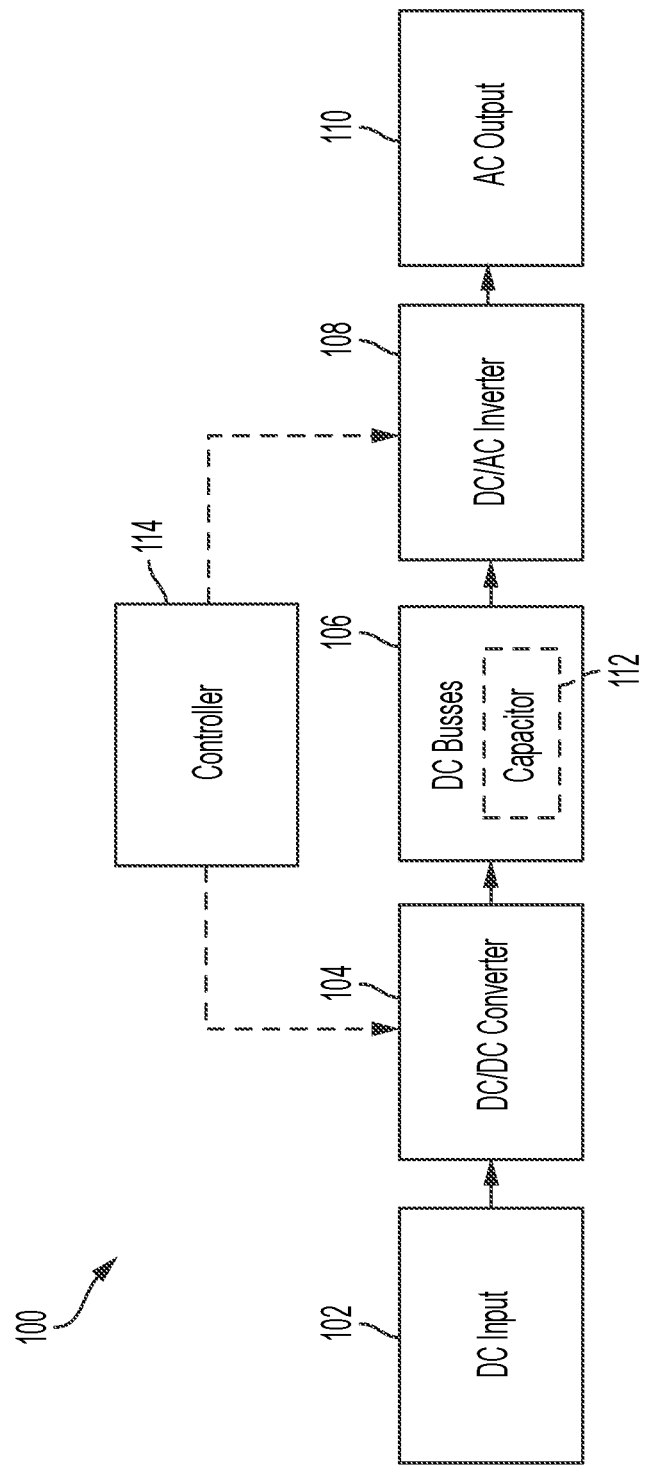
FIG. 1 illustrates a block diagram of a power-conversion system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Power devices may include power-conversion devices, such as a DC/DC converter and a DC/AC inverter. The power-conversion device may also include a DC-link capacitor coupled between the DC/DC converter and the DC/AC inverter. The DC-link capacitor may provide an intermediary energy-storage stage to store power provided by the DC/DC converter, and drawn by the DC/AC inverter.

The DC/DC converter may receive input DC power, convert the DC power, and provide converted DC power to the DC-link capacitor to charge the DC-link capacitor. The DC/AC inverter may draw DC power from the DC-link capacitor, invert the DC power, and provide inverted AC power to an output. For example, the DC/AC inverter may provide inverted AC power to a load.

A converter control scheme of the DC/DC converter may be independent from an inverter control scheme of the DC/AC inverter. For example, the DC/DC converter may be controlled to provide power to the DC-link capacitor independently from controlling the DC/AC inverter to draw power from the DC-link capacitor. A control scheme of the DC/DC converter may regard the DC-link capacitor as a load without being aware of the presence of the DC/AC inverter drawing power from the DC-link capacitor. Similarly, a control scheme of the DC/AC inverter may regard the DC-link capacitor as a source without being aware of the presence of the DC/DC converter providing power to the DC-link capacitor.

Accordingly, the DC/DC converter may provide power to the DC-link capacitor independent of an amount of power drawn from the DC-link capacitor by the DC/AC inverter, and the DC/AC inverter may draw power from the DC-link capacitor independent of an amount of power provided to the DC-link capacitor by the DC/DC converter. An amount of power provided by the DC/DC converter to the DC-link capacitor in a certain period of time may therefore differ from an amount of power drawn by the DC/AC converter from the DC-link capacitor in the same period of time.

In some examples, a capacitance of the DC-link capacitor may be relatively high to accommodate filtering requirements and to absorb reactive currents. For example, the DC-link capacitor may be implemented as an electrolytic capacitor. An output inductor may be implemented between the DC/DC converter and the DC-link capacitor to filter power provided by the DC/DC converter to the DC-link capacitor.

In alternate examples, a DC/DC converter may be controlled to provide power to a DC/AC inverter in synchronization with the DC/AC inverter drawing power from the DC/DC converter. "Synchronization" may include the DC/DC converter and DC/AC inverter providing and drawing, respectively, substantially equal amounts of power to one another rather than (or in addition to) providing power to, and drawing power from, a DC-link capacitor as an intermediary stage. In some examples, a capacitor may still be implemented between the DC/DC converter and the DC/AC inverter where the DC/DC converter DC/AC inverter are operated in synchronization. However, in some examples the capacitor in such examples may have a smaller capacitance than in previous examples. For example, the capacitor may be implemented as a film capacitor. Moreover, the filtering output inductor may be omitted in some examples in which power is provided directly from the DC/DC converter to the DC/AC inverter.

Examples of the disclosure provide improved power-conversion devices at least in part by implementing synchronized control of a DC/DC converter and a DC/AC inverter. The DC/DC converter may be controlled to provide power directly to the DC/AC inverter, substantially bypassing a bus capacitor. Providing a synchronized control scheme may simplify control of the DC/DC converter and DC/AC inverter by providing substantially similar or identical control signals to certain components of the DC/DC converter as to certain components of the DC/AC inverter, including converter switches and inverter switches.

Operating the DC/DC converter and DC/AC inverter in synchronization may include closing one or more converter switches approximately simultaneously with one or more inverter switches, as discussed in greater detail below. For example, a duty cycle of the one or more converter switches and the duty cycle of the one or more synchronized inverter switches may overlap approximately 100% with one another during synchronous operation. As used herein, "approximately simultaneously" may indicate that the duty cycles of the one or more converter switches and the duty cycles of the one or more inverter switches overlap by at least about 99.9% in some examples, by at least about 99% in some examples, by at least about 95% in some examples, by at least about 90% in some examples, or other non-limiting ranges of duty-cycle overlaps. In other examples, "approximately simultaneously" may indicate that control signals are sent to the one or more converter switches within a certain time of sending one or more control signals to the one or more inverter switches, such as within about 0.01 µs, within about 0.1 µs, within about 1 µs, or other non-limiting ranges of time delays.

In examples in which the capacitor is included, the capacitor may be advantageously smaller in capacitance and physical size than in examples in which a DC-link capacitor is implemented as an intermediary stage, and a filtering output inductor may be advantageously omitted. Turn-on losses in switches of the DC/DC converter may be advantageously minimized as explained in greater detail below by implementation of the synchronized control scheme.

Example power-conversion devices may include, or be implemented in, any of several power devices. For purposes of explanation, examples may be provided in which power-conversion devices are implemented in power supplies, such as uninterruptible power supplies (UPSs). In one example, the power-conversion devices include a DC/DC converter and a DC/AC inverter implemented in a power supply that is configured to harness solar power. For example, the solar-power device may receive solar energy, charge an energy-storage device with the solar energy, and discharge the stored energy to the DC/DC converter. The DC/DC converter may convert the received power and provide converted DC power to the DC/AC inverter. The DC/AC inverter may invert the converted DC power and provide AC power to a load, such as a power grid or other load. However, it is to be appreciated that principles of the disclosure are applicable to other types of power devices, other types of energy sources, and other types of loads.

FIG. 1 illustrates a block diagram of a power-conversion system 100 according to an example. The power-conversion system 100 may be implemented in a UPS. For example, the power-conversion system 100 may be implemented in a UPS configured to convert power drawn from solar energy to output power to provide to a load, such as a power grid. The power-conversion system 100 includes a DC input 102, a DC/DC converter 104, one or more DC busses 106 ("DC busses 106"), a DC/AC inverter 108, an AC output 110, one or more optional capacitors 112 ("capacitor 112"), and one or more controllers 114 ("controller 114").

The DC input 102 is coupled to the DC/DC converter 104, and is configured to be coupled to a DC-power source. For example, the DC-power source may include an energy-storage device such as a battery. The DC/DC converter 104 is coupled to the DC input 102 at a first connection, is coupled to the DC busses 106 and the capacitor 112 at a second connection, and is communicatively coupled to the controller 114. The DC busses 106 are coupled to the DC/DC converter 104 at a first connection and are coupled to the DC/AC inverter 108 at a second connection, and may include or be coupled to the capacitor 112.

The DC/AC inverter 108 is coupled to the DC busses 106 and the capacitor 112 at a first connection, is coupled to the AC output 110 at a second connection, and is communicatively coupled to the controller 114. The AC output 110 is coupled to the DC/AC inverter 108, and is configured to be coupled to a load. For example, the load may be a power grid to which the power-conversion system 100 provides AC power. The capacitor 112 is coupled to the DC busses 106, the DC/DC converter 104, and the DC/AC inverter 108. The controller 114 is communicatively coupled to the DC/DC converter 104 and the DC/AC inverter 108.

The DC input 102 is configured to receive DC power from a DC-power source, such as a battery, and provide the DC power to the DC/DC converter 104. The DC/DC converter 104 receives the DC power, converts the DC power to converted DC power, and provides the converted DC power to the DC busses 106. Converting the DC power to converted DC power may include stepping up or stepping down a voltage of the DC power received from the DC input 102. The DC/DC converter 104 is controlled according to one or more control signals provided by the controller 114.

The DC busses 106 provide the converted DC power to the DC/AC inverter 108 and, in some examples, to the capacitor 112. The DC busses 106 provide the converted DC power to the DC/AC inverter 108. The DC/AC inverter 108 receives the converted DC power, inverts the converted DC power to inverted AC power, and provides the inverted AC power to the AC output 110. The DC/AC inverter 108 is controlled according to one or more control signals provided by the controller 114.

The controller 114 is configured to control operation of the power-conversion system 100, such as by controlling operation of the DC/DC converter 104 and the DC/AC inverter 108. The DC/DC converter 104 and the DC/AC inverter 108 may each include one or more switches. The controller 114 may control the switches by providing control signals, such as pulse-width-modulation (PWM) signals, to the switches. In some examples, the controller 114 may synchronize control of the DC/DC converter 104 with control of the DC/AC inverter 108. In other examples, the controller 114 may not synchronize control of the DC/DC converter 104 with control of the DC/AC inverter 108. An example of a non-synchronized control scheme executed by the controller 114 is provided with respect to FIG. 2. An example of a synchronized control scheme executed by the controller 114 is provided with respect to FIG. 3.

Figure 2:
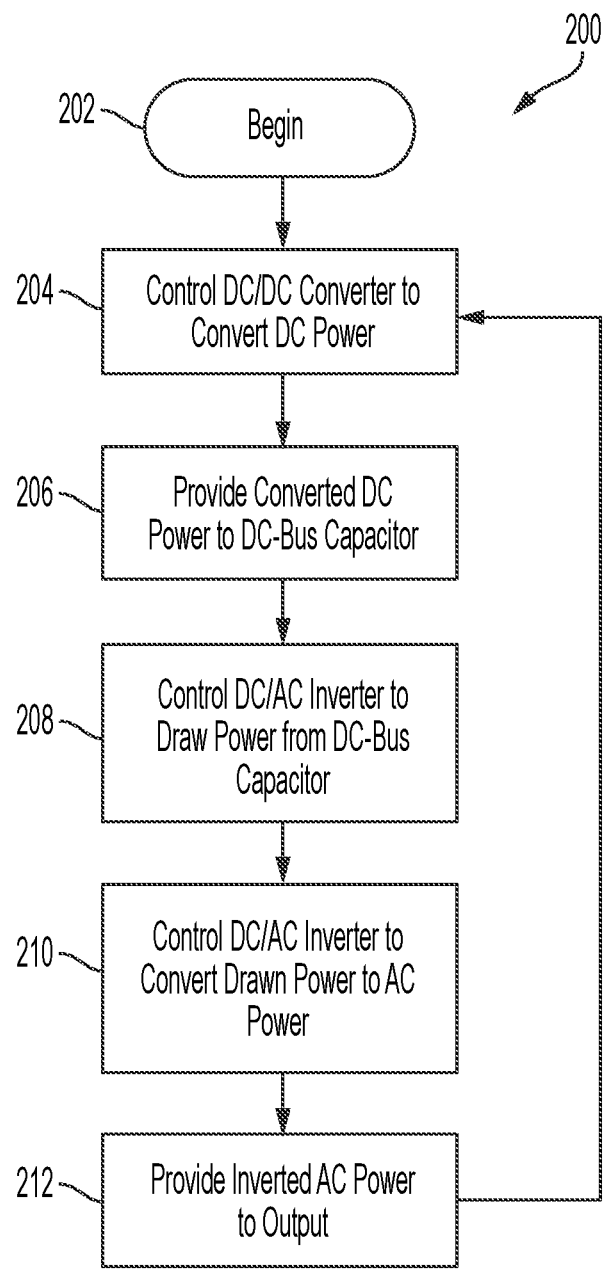
FIG. 2 illustrates a process of controlling the power-conversion system of FIG. 1 with a non-synchronized control scheme according to an example.

FIG. 2 illustrates a process 200 of controlling the power-conversion system 100 with a non-synchronized control scheme according to an example. The process 200 may be executed at least in part by the controller 114, the DC/DC converter 104, and the DC/AC inverter 108. It is to be appreciated that acts of the process 200 are illustrated sequentially for purposes of explanation only. In some examples, one or more acts of the process 200 may be executed substantially simultaneously. Furthermore, the order of acts of the process 200 are provided for purposes of explanation only, and in some examples acts of the process 200 may be executed in a different order.

At act 202, the process 200 begins.

At act 204, the controller 114 controls the DC/DC converter 104 to convert DC power received from the DC input 102. Controlling the DC/DC converter 104 may include providing control signals to one or more switches in the DC/DC converter 104 to step-up or step-down a voltage level of the DC power received from the DC input 102. In some examples, the DC/DC converter 104 includes a step-up transformer, and act 204 includes controlling the one or more switches to provide power from the DC input 102 to a primary winding of the step-up transformer. Converted DC power may be output at a secondary winding of the step-up transformer. Controlling the one or more switches in the DC/DC converter 104 may include alternately coupling the DC input 102 to a first connection of the transformer and a second connection of the transformer.

At act 206, converted DC power is provided from the DC/DC converter 104 to the capacitor 112. Continuing with the example above, the secondary winding of the step-up transformer may provide the converted DC power to the capacitor 112 to charge the capacitor 112.

At act 208, the controller 114 controls the DC/AC inverter 108 to draw power from the capacitor 112. Controlling the DC/AC inverter 108 may include providing control signals to one or more switches in the DC/AC inverter 108 to draw power from the capacitor 112. An amount of power drawn from the capacitor 112 at act 208 may not be equal to an amount of power provided to the capacitor 112 at act 204 in examples in which the controller 114 does not synchronize control of the DC/DC converter 104 at act 204 with control of the DC/AC inverter 108 at act 208.

At act 210, the controller 114 controls the DC/AC inverter 108 to convert the power drawn from the capacitor 112 to AC power. As discussed above, the DC/AC inverter 108 may include one or more inverter switches. Act 210 may include providing one or more PWM signals to the one or more inverter switches to invert the DC power and produce inverted AC power.

At act 212, the DC/AC inverter 108 provides the inverted AC power to the AC output 110. The inverted AC power may be provided from the AC output 110 to a load. For example, as discussed above, the load may include an AC-power grid. The process 200 then returns to act 204. As discussed above, acts of the process 200 may be executed in a different order, and acts of the process 200 may be executed substantially simultaneously. Similarly, the process 200 may proceed from act 212 to any of acts 204-210.

Accordingly, the process 200 may provide an example of a non-synchronized control scheme at least because the controller 114 controls the DC/DC converter 104 independently from the DC/AC inverter 108. The controller 114 controls the DC/DC converter 104 to provide power to the capacitor 112 and separately controls the DC/AC inverter 108 to draw power from the capacitor 112. An amount of power provided to the capacitor 112 may differ from an amount of power drawn from the capacitor 112 in a non-synchronized control scheme.

Figure 3:
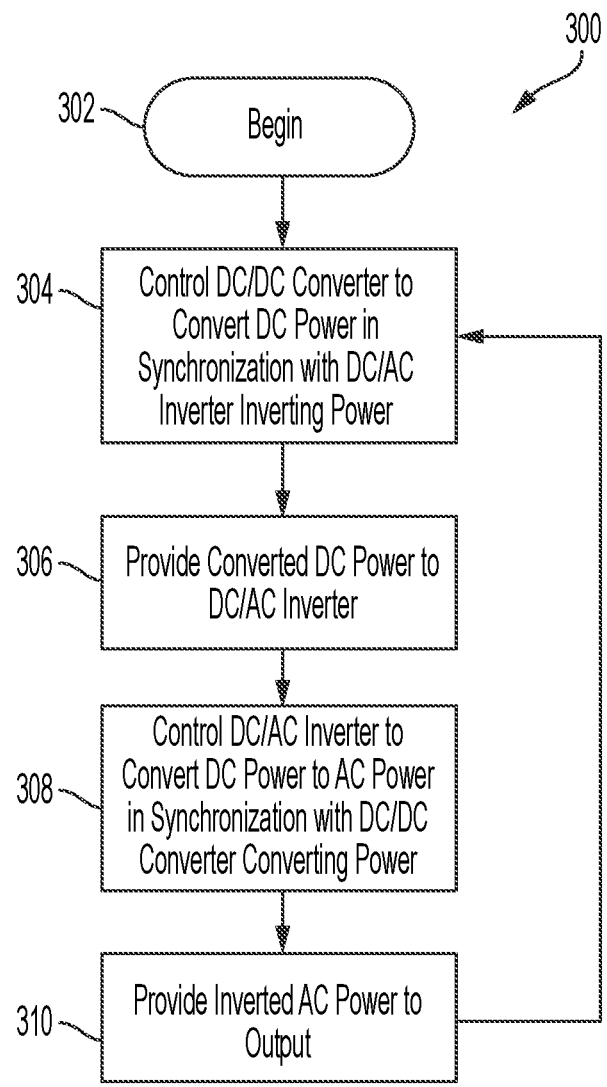
FIG. 3 illustrates a process of controlling the power-conversion system of FIG. 1 with a synchronized control scheme according to an example.

FIG. 3 illustrates a process 300 of controlling the power-conversion system 100 with a synchronized control scheme according to another example. The process 300 may be executed at least in part by the controller 114, the DC/DC converter 104, and the DC/AC inverter 108. It is to be appreciated that acts of the process 300 are illustrated sequentially for purposes of explanation only. In some examples, one or more acts of the process 300 may be executed substantially simultaneously. Furthermore, the order of acts of the process 300 are provided for purposes of explanation only, and in some examples acts of the process 300 may be executed in a different order.

At act 302, the process 300 begins.

At act 304, the controller 114 controls the DC/DC converter 104 to convert DC power in synchronization with the DC/AC inverter 108 inverting power. As discussed above, the DC/DC converter 104 may include one or more switches and at least one step-up transformer. The controller 114 may provide PWM signals to one or more switches of the DC/DC converter 104 and the DC/AC inverter 108 such that periods of time in which the DC/DC converter 104 is converting DC power to provide to the DC/AC inverter 108 is aligned with (for example, synchronized with) periods of time in which the DC/AC inverter 108 is inverting DC power to produce AC power.

At act 306, the DC/DC converter 104 provides converted DC power to the DC/AC inverter 108. The DC/DC converter 104 may provide the converted DC power directly to the DC/AC inverter 108, substantially bypassing the capacitor 112. In some examples, a portion of the converted DC power may be provided to the capacitor 112. However, a substantial portion of the converted DC power may be provided directly to the DC/AC inverter 108 from the DC/DC converter 104 without first being provided to the capacitor 112.

At act 308, the controller 114 controls the DC/AC inverter 108 to convert DC power to AC power in synchronization with the DC/DC converter 104 converting power. The DC/AC inverter 108 may include one or more inverter switches. As discussed above, the controller 114 may control the one or more inverter switches to draw power from the DC/DC converter 104 in synchronization with the DC/DC converter 104 providing power to the DC/AC inverter 108, such that the DC/AC inverter 108 draws power substantially directly from the DC/DC converter 104 rather than substantially from the capacitor 112.

At act 310, the DC/AC inverter 108 provides inverted AC power to the AC output 110. The inverted AC power may be provided from the AC output 110 to a load. For example, as discussed above, the load may include an AC-power grid. The process 300 then returns to act 304. As discussed above, acts of the process 300 may be executed in a different order, and acts of the process 300 may be executed substantially simultaneously. Similarly, the process 300 may proceed from act 310 to any of acts 304-308.

Accordingly, the process 300 may provide an example of a synchronized control scheme at least because the controller 114 substantially aligns (for example, synchronizes) periods of time during which power is provided by the DC/DC converter 104 with periods of time during which power is drawn by the DC/AC inverter 108. Power provided by the DC/DC converter 104 to the DC/AC inverter 108 may substantially bypass the capacitor 112. An amount of power provided by the DC/DC converter 104 may be substantially equal to an amount of power drawn by the DC/AC inverter 108 in a given period of time during synchronized control.

Figure 4:
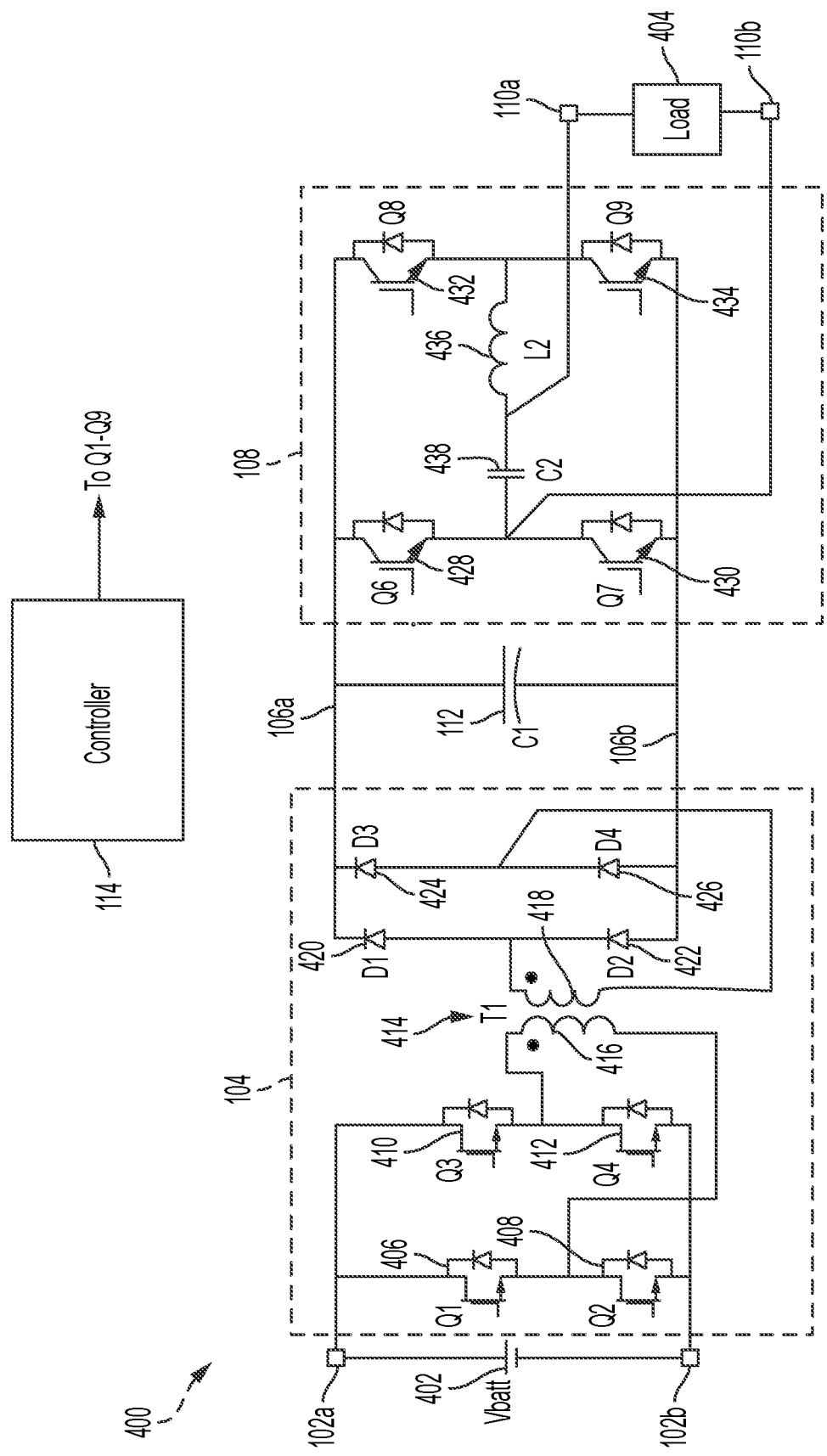
FIG. 4 illustrates a schematic diagram of a power-conversion system according to an example.

FIG. 4 illustrates a schematic diagram of a power-conversion system 400 according to an example. The power-conversion system 400 may illustrate one example of the power-conversion system 100, and similar components are labeled accordingly. The power-conversion system 400 includes the DC input 102, the DC/DC converter 104, the DC busses 106, a DC/AC inverter 108, the AC output 110, the capacitor 112, and the controller 114. The DC input 102 includes a first DC input 102a and a second DC input 102b. The DC busses 106 include a first DC bus 106a (or a "positive DC bus") and a second DC bus 106b (or a "negative DC bus"). The AC output 110 includes a first AC output 110a and a second AC output 110b. The power-conversion system 400 is configured to be coupled to an energy-storage device 402 via the DC input 102, and is configured to be coupled to a load 404 via the AC output 110.

The DC/DC converter 104 includes a first converter switch 406, a second converter switch 408, a third converter switch 410, a fourth converter switch 412, a transformer 414 including a primary winding 416 and a secondary winding 418, a first diode 420, a second diode 422, a third diode 424, and a fourth diode 426. The DC/AC inverter 108 includes a first inverter switch 428, a second inverter switch 430, a third inverter switch 432, a fourth inverter switch 434, an inductor 436 (or "output inductor 436"), and a capacitor 438.

The first DC input 102a is coupled to the first converter switch 406 and the third converter switch 410, and is configured to be coupled to the energy-storage device 402. The second DC input 102b is coupled to the second converter switch 408 and to the fourth converter switch 412, and is configured to be coupled to the energy-storage device 402. In one example, the energy-storage device 402 includes a positive terminal configured to be coupled to the first DC input 102a, and a negative terminal configured to be coupled to the second DC input 102b.

The first converter switch 406 is coupled to the first DC input 102a and the third converter switch 410 at a first connection, is coupled to the second converter switch 408 and the primary winding 416 at a second connection, and is communicatively coupled to the controller 114 at a control connection. The second converter switch 408 is coupled to the first converter switch 406 and the primary winding 416 at a first connection, is coupled to the second DC input 102b and the fourth converter switch 412 at a second connection, and is communicatively coupled to the controller 114 at a control connection.

The third converter switch 410 is coupled to the first DC input 102a and the first converter switch 406 at a first connection, is coupled to the fourth converter switch 412 and the primary winding 416 at a second connection, and is communicatively coupled to the controller 114 at a control connection. The fourth converter switch 412 is coupled to the third converter switch 410 and the primary winding 416 at a first connection, is coupled to the second DC input 102b and the second converter switch 408 at a second connection, and is communicatively coupled to the controller 114 at a control connection.

The primary winding 416 is coupled to the third converter switch 410 and the fourth converter switch 412 at a first connection, is coupled to the first converter switch 406 and the second converter switch 408 at a second connection, and is magnetically coupled to the secondary winding 418. The secondary winding 418 is coupled to the first diode 420 and the second diode 422 at a first connection, is coupled to the third diode 424 and the fourth diode 426 at a second connection, and is magnetically coupled to the primary winding 416.

The first diode 420 is coupled to the third diode 424, the capacitor 112, the first inverter switch 428, and the third inverter switch 432 via the first DC bus 106a at a cathode connection, and is coupled to the secondary winding 418 and the second diode 422 at an anode connection. The second diode 422 is coupled to the first diode 420 and the secondary winding 418 at a cathode connection, and is coupled to the fourth diode 426, the capacitor 112, the second inverter switch 430, and the fourth inverter switch 434 via the second DC bus 106b at an anode connection.

The third diode 424 is coupled to the first diode 420, the capacitor 112, the first inverter switch 428, and the third inverter switch 432 via the first DC bus 106a at a cathode connection, and is coupled to the secondary winding 418 and the fourth diode 426 at an anode connection. The fourth diode 426 is coupled to the third diode 424 and the secondary winding 418 at a cathode connection, and is coupled to the second diode 422, the capacitor 112, the second inverter switch 430, and the fourth inverter switch 434 via the second DC bus 106b at an anode connection.

The capacitor 112 is coupled to the first diode 420, the third diode 424, the first inverter switch 428, and the third inverter switch 432 at a first connection via the first DC bus 106a, and is coupled to the second diode 422, the fourth diode 426, the second inverter switch 430, and the fourth inverter switch 434 at a second connection via the second DC bus 106b. The first DC bus 106a is coupled to the first diode 420, the third diode 424, the first inverter switch 428, and the third inverter switch 432. The second DC bus 106b is coupled to the second diode 422, the fourth diode 426, the second inverter switch 430, and the fourth inverter switch 434.

The first inverter switch 428 is coupled to the first diode 420, the third diode 424, the capacitor 112, and the third inverter switch 432 via the first DC bus 106a, is coupled to the second inverter switch 430, the capacitor 438, and the second AC output 110*b* at a second connection, and is communicatively coupled to the controller 114 at a control connection. The second inverter switch 430 is coupled to the first inverter switch 428, the capacitor 438, and the second AC output 110*b* at a first connection, is coupled to the second diode 422, the fourth diode 426, the capacitor 112, and the fourth inverter switch 434 via the second DC bus 106*b* at a second connection, and is communicatively coupled to the controller 114 at a control connection.

The third inverter switch 432 is coupled to the first diode 420, the third diode 424, the capacitor 112, and the first inverter switch 428 via the first DC bus 106*a* at a first connection, is coupled to the inductor 436 and the fourth inverter switch 434 at a second connection, and is communicatively coupled to the controller 114 at a control connection. The fourth inverter switch 434 is coupled to the third inverter switch 432 and the inductor 436 at a first connection, is coupled to the second diode 422, the fourth diode 426, the capacitor 112, and the second inverter switch 430 at a second connection, and is communicatively coupled to the controller 114 at a control connection.

The inductor 436 is coupled to the capacitor 438 and the first AC output 110*a* at a first connection, and is coupled to the third inverter switch 432 and the fourth inverter switch 434 at a second connection. The capacitor 438 is coupled to the first inverter switch 428, the second inverter switch 430, and the second AC output 110*b* at a first connection, and is coupled to the inductor 436 and the first AC output 110*a* at a second connection. The first AC output 110*a* is coupled to the inductor 436 and the capacitor 438, and is configured to be coupled to the load 404. The second AC output 110*b* is coupled to the first inverter switch 428, the second inverter switch 430, and the capacitor 438, and is configured to be coupled to the load 404. The load 404 is configured to be coupled to the first AC output 110*a* at a first connection and is configured to be coupled to the second AC output 110*b* at a second connection.

The controller 114 is communicatively coupled to the converter switches 406-412 and to the inverter switches 428-434. The controller 114 is configured to provide one or more control signals to the converter switches 406-412 and to the inverter switches 428-434. For example, the controller 114 may provide one or more PWM signals to the converter switches 406-412 and/or to the inverter switches 428-434 as discussed above with respect to the process 300. An example of controlling the power-conversion system 400 is provided with respect to FIG. 5.

Figure 5:
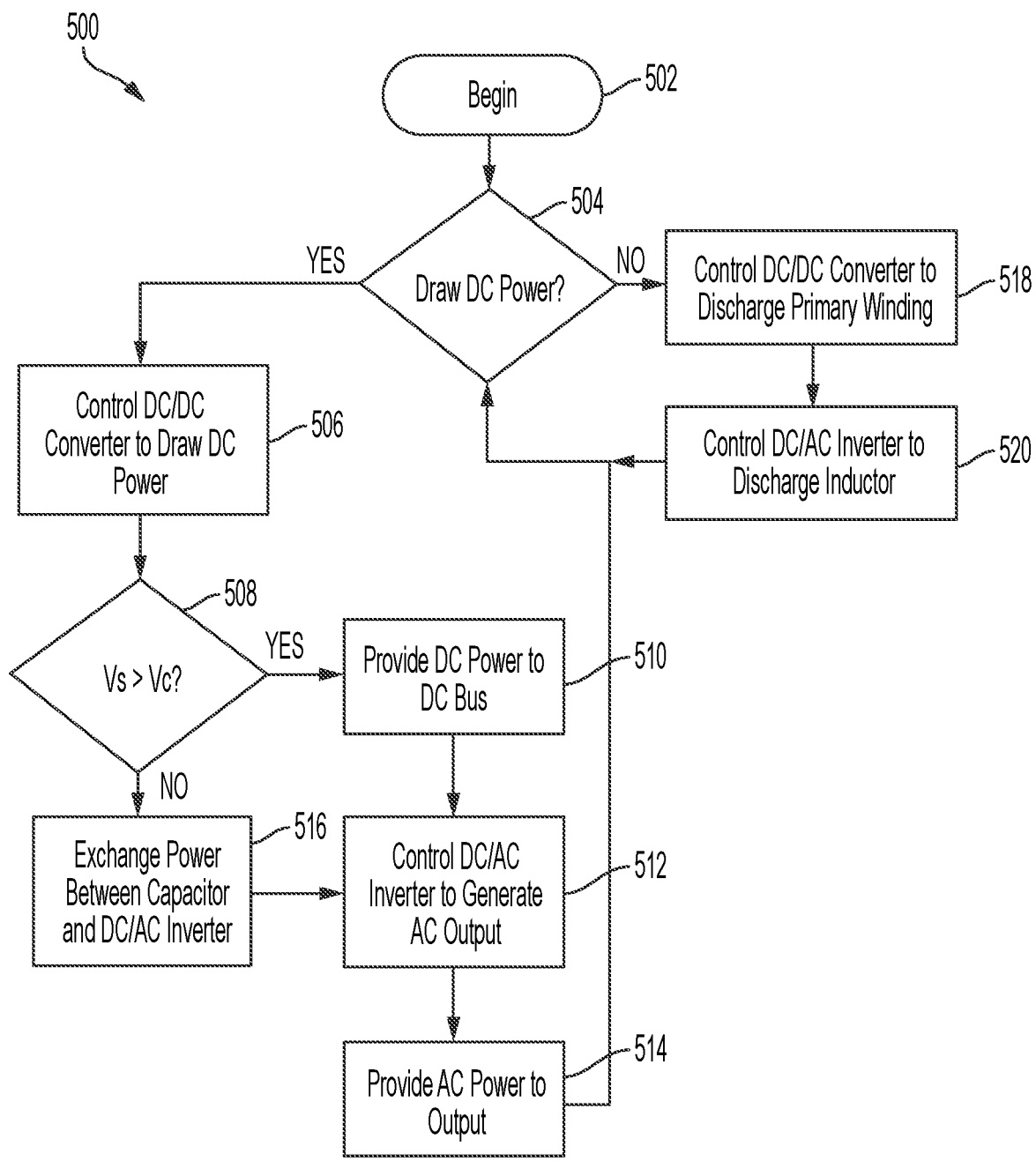
FIG. 5 illustrates a process of controlling the power-conversion system of FIG. 4 according to an example.
Figure 6:
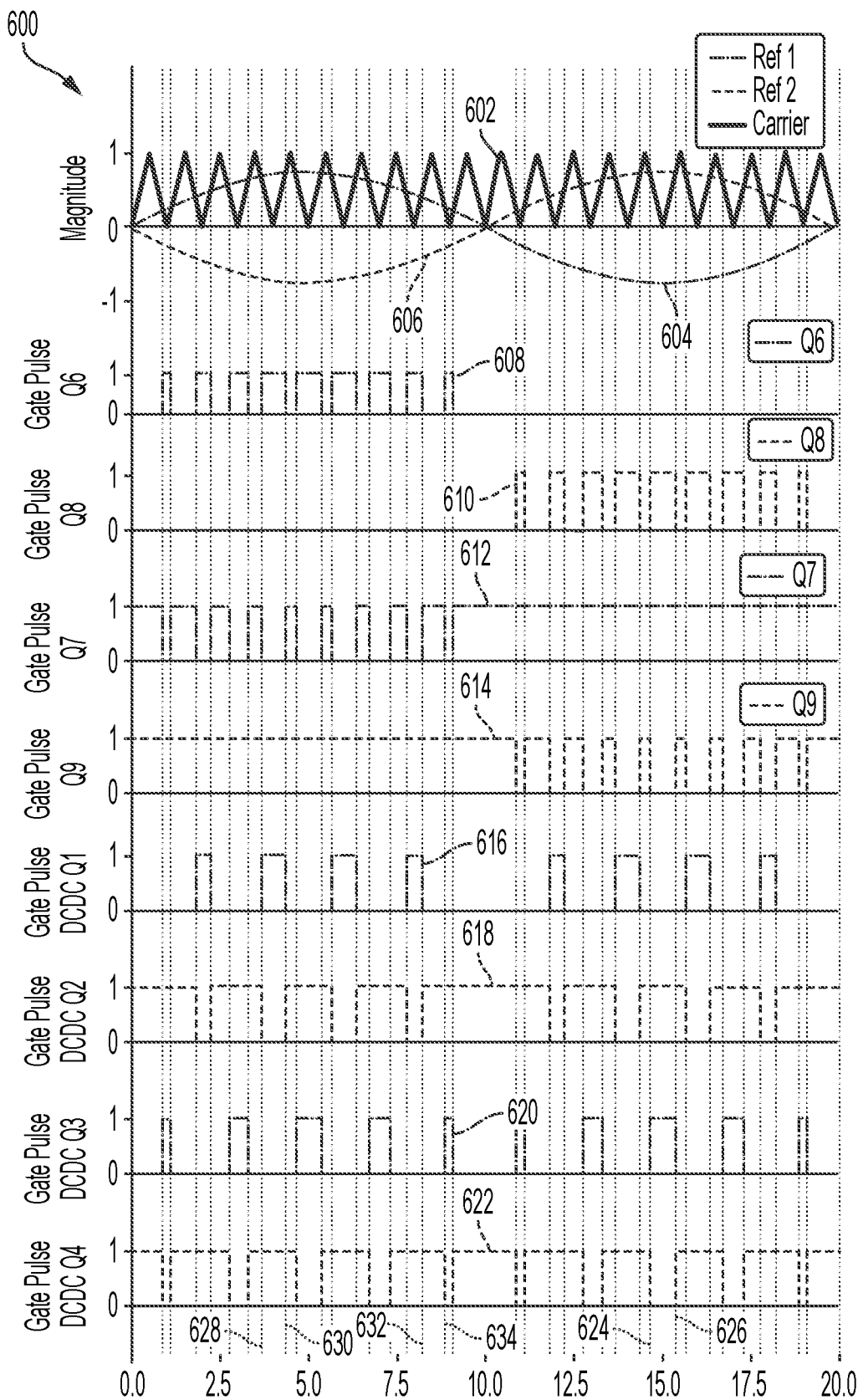
FIG. 6 illustrates a graph indicative of a control scheme of the power-conversion system of FIG. 4 according to an example.

FIG. 5 illustrates a process 500 of controlling the power-conversion system 400 according to an example. The process 500 may be executed at least in part by the controller 114. Acts of the process 500 may be executed simultaneously, and may be executed in a different order than that illustrated in the following examples. Relatedly, FIG. 6 illustrates a graph 600 indicative of a control scheme executed by the controller 114 according to an example. As discussed below, the graph 600 is indicative of control signals provided by the controller 114 pursuant to the acts of the process 500.

At act 502, the process 500 begins.

At act 504, a determination is made as to whether to control the DC/DC converter 104 to draw DC power from the energy-storage device 402. Power may be drawn from the energy-storage device 402 based on a control scheme executed by the controller 114. In examples in which the power-conversion system 400 outputs an AC waveform at the AC output 110, power may be drawn from the energy-storage device 402 according to a target amplitude of the output AC waveform. For example, more power may be drawn from the energy-storage device 402 while outputting high-amplitude portions of the AC waveform compared to outputting lower-amplitude portions of the AC waveform. Examples are provided with respect to the graph 600 to illustrate the foregoing.

The graph 600 includes a carrier-waveform trace 602, a first reference-waveform trace 604, a second reference-waveform trace 606, a first control-signal trace 608 indicative of a control signal provided to the first inverter switch 428, a second control-signal trace 610 indicative of a control signal provided to the third inverter switch 432, a third control-signal trace 612 indicative of a second inverter switch 430, a fourth control-signal trace 614 indicative of a control signal provided to the fourth inverter switch 434, a fifth control-signal trace 616 indicative of a control signal provided to the first converter switch 406, a sixth control-signal trace 618 indicative of a control signal provided to the second converter switch 408, a seventh control-signal trace 620 indicative of a control signal provided to the third converter switch 410, and an eighth control-signal trace 622 indicative of a control signal provided to the fourth converter switch 412.

The traces 602-606 provide a visual indication of a determination of when to draw power from the energy-storage device 402. The reference-waveform traces 604, 606 indicate a target output AC waveform and an inversion thereof. In one example, the controller 114 determines to control the converter switches 406-412 to draw power from the energy-storage device 402 where the value of the carrier-waveform trace 602 is between the values of the reference-waveform traces 604, 606.

During these time periods, the primary winding 416 may draw power from the energy-storage device 402 by the controller 114 closing two of the converter switches 406-412, such as the first converter switch 406 and the fourth converter switch 412 or the second converter switch 408 and the third converter switch 410. With reference to the graph 600, power may be drawn from the energy-storage device 402 where the sixth control-signal trace 618 and seventh control-signal trace 620 are simultaneously high, corresponding to closing the converter switches 408, 410, or where the fifth control-signal trace 616 and eighth control-signal trace 622 are simultaneously high, corresponding to closing the converter switches 406, 412. Accordingly, the traces 618, 620 or the traces 616, 622 may be simultaneously high where a value of the carrier-waveform trace 602 is between the values of the reference-waveform traces 604, 606.

For example, between a first time 624 and a second time 626, the value of the carrier-waveform trace 602 is between the values of the reference-waveform traces 604, 606, and the controller 114 may determine that power should be drawn from the energy-storage device 402. Accordingly, act 504 may be visually represented by determining whether the carrier-waveform trace 602 is between the reference-waveform traces 604, 606. Responsive to determining that DC power is to be drawn from the energy-storage device 402 (504 YES), the process 500 continues to act 506.

At act 506, the controller 114 controls the DC/DC converter 104 to draw DC power from the energy-storage device 402. As discussed above, controlling the DC/DC converter 104 to draw DC power from the energy-storage device 402 may include controlling two of the converter switches 406-412 to couple the energy-storage device 402 to the primary winding 416 of the transformer 414. For example, between the first time 624 and the second time 626, the controller 114 may provide control signals to close the second converter switch 408 and the third converter switch 410 as indicated by the sixth control-signal trace 618 and the seventh control-signal trace 620 being simultaneously high.

It is to be appreciated that the period of time between the first time 624 and the second time 626 is only one example of the DC/DC converter 104 drawing DC power from the energy-storage device 402. With reference to the graph 600, the DC/DC converter 104 may draw DC power from the energy-storage device 402 where the traces 618, 620 or the traces 616, 622 are simultaneously high. Accordingly, while examples of act 506 include controlling the converter switches 408, 410 to couple the primary winding 416 to the energy-storage device 402, other examples of act 506 may include controlling the converter switches 406, 412 to couple the primary winding 416 to the energy-storage device 402.

Figure 7:
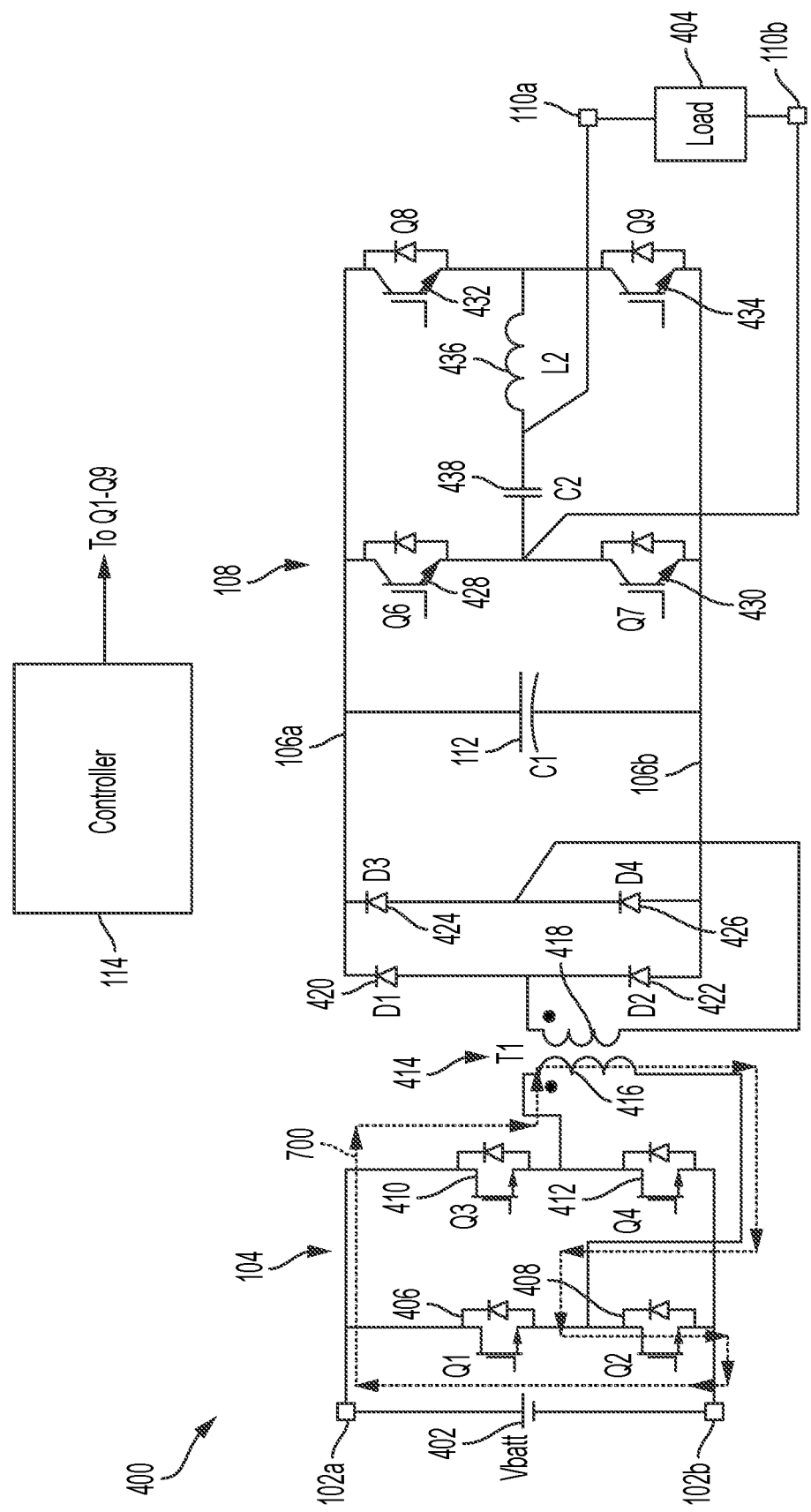
FIG. 7 illustrates a schematic diagram of the power-conversion system of FIG. 4 including a first current according to an example.

Closing the converter switches 408, 410 electrically couples the primary winding 416 to the energy-storage device 402. FIG. 7 illustrates a schematic diagram of the power-conversion system 400 in which the converter switches 408, 410 are closed and conductive, thereby coupling the primary winding 416 to the energy-storage device 402. A current path 700 indicates a path of current provided to the primary winding 416 by the energy-storage device 402. As indicated by the current path 700, a current is received from the energy-storage device 402 at the first DC input 102*a*, and passes through the third converter switch 410, the primary winding 416, and the second converter switch 408, and returns to the energy-storage device 402 via the second DC input 102*b*. A current passing through the primary winding 416 may induce a voltage and/or current in the secondary winding 418 of the transformer 414.

At act 508, a determination is made as to whether a voltage of the secondary winding 418 is greater than a voltage of the capacitor 112. Providing power to the primary winding 416 of the transformer 414 may induce a voltage across the secondary winding 418 of the transformer 414 as discussed above. However, the voltage across the secondary winding 418 may not be greater than a voltage across the capacitor 112. Because the secondary winding 418 is coupled to, and configured to discharge power through, either the first diode 420 or third diode 424, the secondary winding 418 may not discharge power to the first DC bus 106*a* if the voltage of the secondary winding 418 is less than the voltage of the capacitor 112, because the diodes 420, 424 may be reverse-biased. In at least one example, act 508 does not include any particular component performing a determination, and act 508 is illustrated for purposes of explanation to discuss a situation in which the diodes 420, 424 are reverse-biased, and a situation in which the diodes 420, 424 are forward-biased.

For example, if a voltage is high at the dotted connection of the secondary winding 418 but is less than a voltage of the capacitor 112 (508 NO), the first diode 420 will be reverse-biased and will not be conductive. Otherwise, if a voltage is high at the dotted connection of the secondary winding 418 and is greater than a voltage of the capacitor 112 (508 YES), the first diode 420 will be forward-biased and will be conductive, and the process 500 continues to act 510.

Similarly, if a voltage is high at the non-dotted connection of the secondary winding 418 but is less than a voltage of the capacitor 112 (508 NO), the third diode 424 will be reverse-biased and will not be conductive. Otherwise, if a voltage is high at the non-dotted connection of the secondary winding 418 and is greater than a voltage of the capacitor 112 (508 YES), the third diode 424 will be forward-biased and will be conductive, and the process 500 continues to act 510. A situation in which the first diode 420 or third diode 424 is forward-biased will first be discussed.

Figure 8:
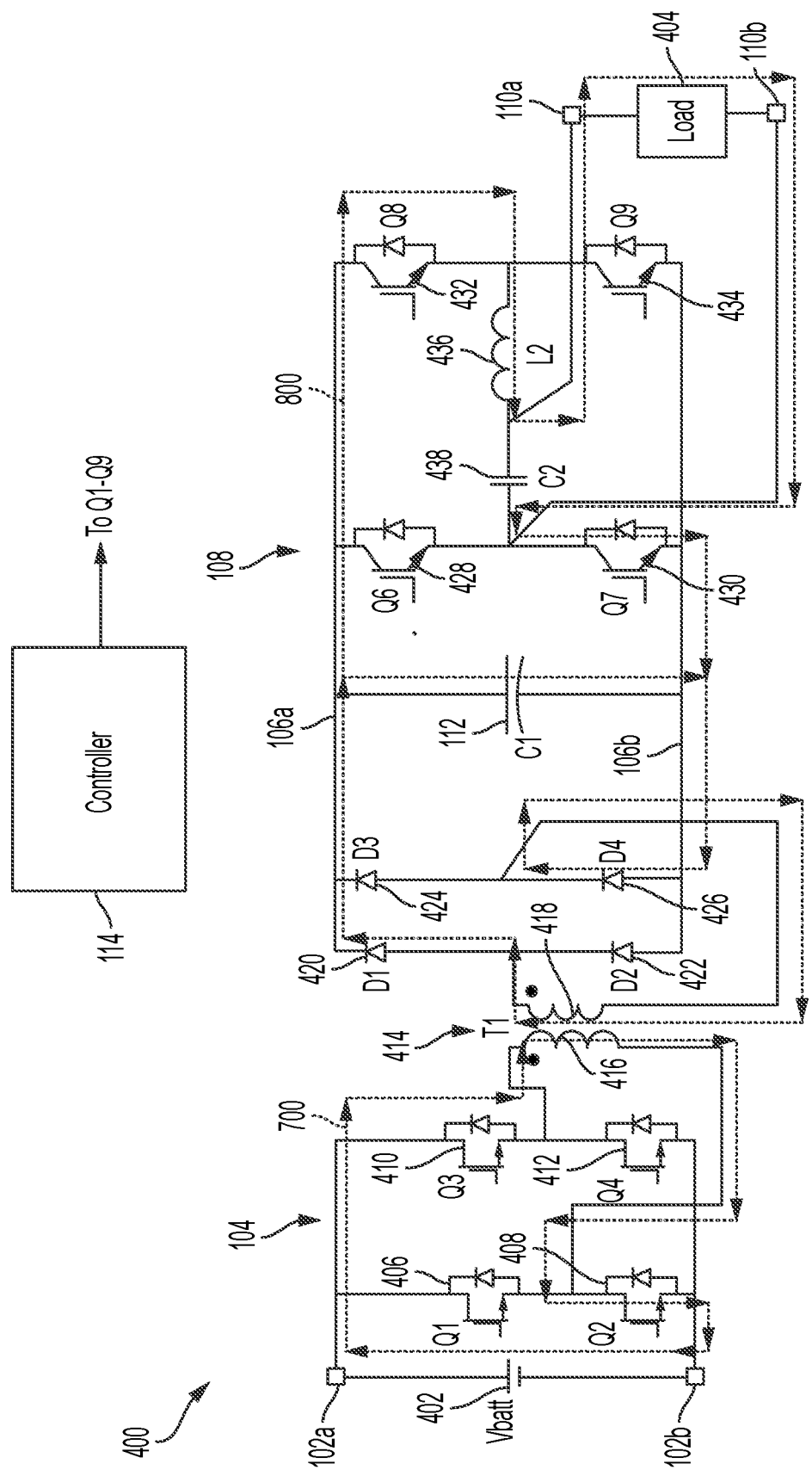
FIG. 8 illustrates a schematic diagram of the power-conversion system of FIG. 4 including a second current according to an example.

At act 510, the DC/DC converter 104 provides DC power to the first DC bus 106*a*. DC power may be provided to the first DC bus 106*a* via either the first diode 420 or third diode 424, depending on whether a dotted or non-dotted connection of the secondary winding 418 is high. FIG. 8 illustrates a schematic diagram of the power-conversion system 400 in which the dotted connection of the secondary winding 418 is high and, as discussed above, a voltage of the secondary winding 418 is greater than a voltage of the capacitor 112. At least because the first diode 420 is forward-biased, the secondary winding 418 discharges current to the first DC bus 106*a* via the first diode 420. A current path 800 indicates a path of current discharged by the secondary winding 418. As indicated by the current path 800, the current passes from the secondary winding 418 through the first diode 420 to the first DC bus 106*a*.

At act 512, the controller 114 controls the DC/AC inverter 108 to generate an AC output using power provided to the first DC bus 106*a* from the DC/DC converter 104. Controlling the DC/AC inverter 108 to generate an AC output may include simultaneously closing the inverter switches 428, 434 or the inverter switches 430, 432 at varying pulse widths, as indicated by periods of time at which the control-signal traces 608, 614 or control-signal traces 610, 612 are simultaneously high. For example, the inverter switches 428, 434 may be intermittently closed during negative half-cycles of an output AC waveform, and the inverter switches 430, 432 may be intermittently closed during positive half-cycles of an output AC waveform.

FIG. 8 illustrates an example of a time period during which the control-signal traces 610, 612 are simultaneously high, such as between the first time 624 and the second time 626, which may correspond to a positive half-cycle of an output AC waveform. A first portion of the current indicated by the current path 800 passes through the capacitor 112 (for example, to charge the capacitor 112) and returns to the secondary winding 418 via the fourth diode 426.

A second portion of the current is provided directly to the DC/AC inverter 108, which the DC/AC inverter 108 may use to generate an AC output by controlling the inverter switches 430, 432 to intermittently open and close. The second portion of the current may bypass the capacitor 112. Bypassing the capacitor may include the DC/DC converter 104 providing the second portion of the current directly to the DC/AC inverter 108 without first being provided to the capacitor 112. The inverter switches 430, 432 may be closed substantially simultaneously with the second converter switch 408 and third inverter switch 410 between the first time 624 and second time 626, that is, in synchronization with the converter switches 408, 410.

Similarly, the inverter switches 428, 434 may be intermittently closed during a negative half-cycle of an output AC waveform as indicated by the traces 608, 614. For example, between a third time 628 and a fourth time 630, the inverter switches 428, 434 may be simultaneously closed. As indicated by the traces 616, 622, the converter switches 406, 412 may be closed in synchronization with the inverter switches 428, 434 between the third time 629 and fourth time 630.

At act 514, the DC/AC inverter 108 provides an AC output waveform generated by the inverter switches 428-434 to the AC output 110. Returning to FIG. 8, the current path 800 may indicate an example of current between the first time 624 and the second time 626 during which the second inverter switch 430 and third inverter switch 432 are closed. The current path 800 passes through the third inverter switch 432, the inductor 436, the first AC output 110a, the load 404, the second AC output 110b, and the second inverter switch 430, and returns to the secondary winding 418 via the fourth diode 426. A portion of the current may bypass the load 404 and be filtered via the capacitor 438. The process 500 then returns to act 504.

In the foregoing examples, the current path 800 may indicate a path of current for which a voltage across the inductor 436 is in phase with a current through the inductor 436. As appreciated by one of ordinary skill in the art, a voltage across an inductor may not always be in phase with a current through an inductor, such as in examples in which the load 404 is a reactive load. Accordingly, although a voltage may be dropped across the inductor 436 from the first DC bus 106a to the second DC bus 106b, a current may be discharged by the inductor 436 to the first DC bus 106a where an inductor current is out of phase with an inductor voltage.

Figure 9:
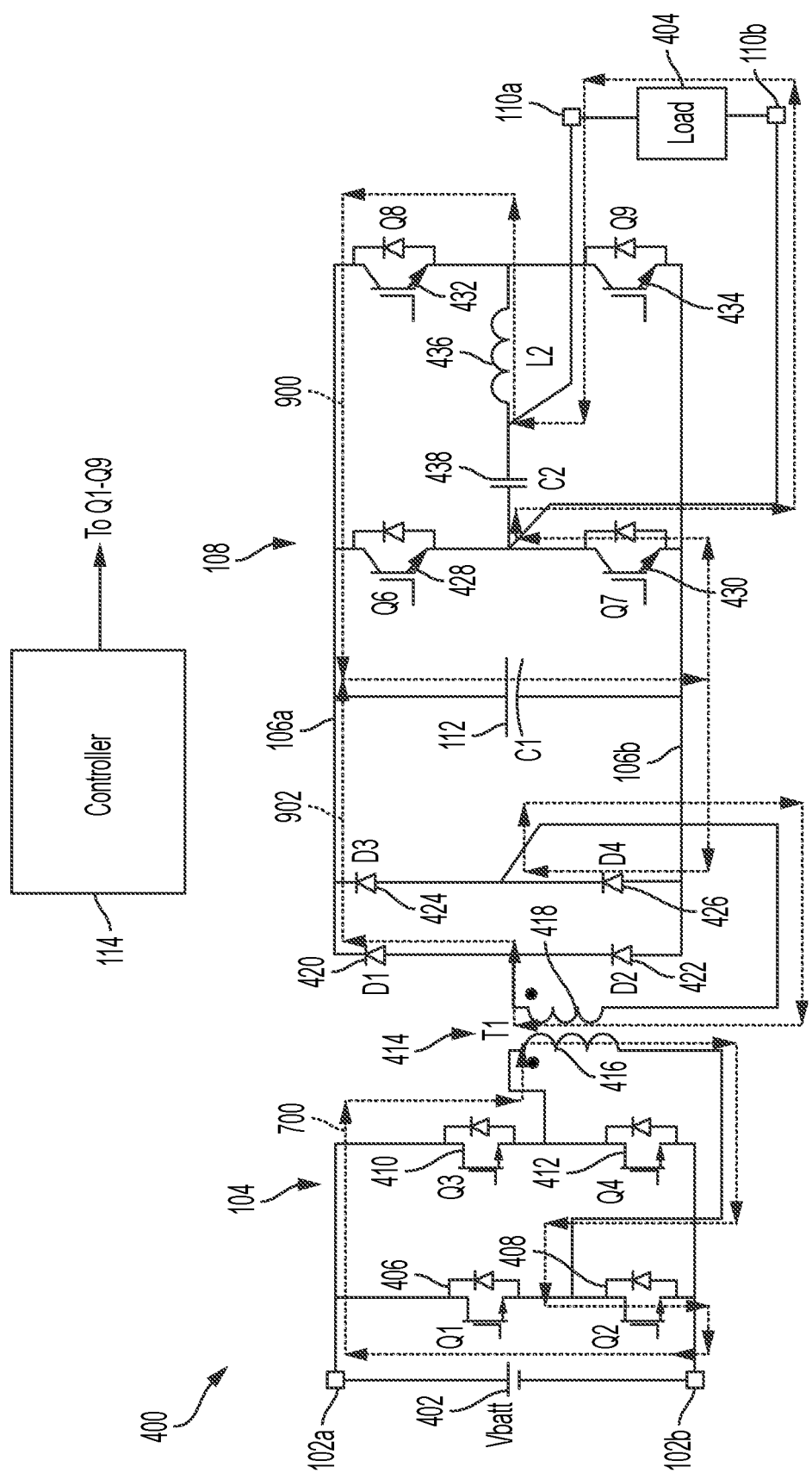
FIG. 9 illustrates a schematic diagram of the power-conversion system of FIG. 4 including a third current according to an example.

FIG. 9 illustrates a schematic diagram of the power-conversion system 400 that is similar to the schematic diagram of FIG. 8, but in which a current through the inductor 436 is out of phase with a voltage across the inductor 436. A first current path 900 indicates a path of current discharged by the inductor 436 while the converter switches 408, 410 and inverter switches 430, 432 are closed, such as between the first time 624 and second time 626. As indicated by the current path 900, the inductor 436 discharges current through the third inverter switch 432 to the capacitor 112 via the first DC bus 106a, such that the capacitor 112 absorbs reactive power stored in the inductor 436. The current returns to the inductor 436 by passing through the second inverter switch 430, the second AC output 110b, the load 404, and the first AC output 110a to the inductor 436. A second current path 902 indicates a path of current discharged by the secondary winding 418 through the first diode 420, the capacitor 112, the fourth diode 426, and back to the secondary winding 418.

Accordingly, while the switches 408, 410, 430, 432 are closed and a voltage of the secondary winding 418 exceeds a voltage of the capacitor 112, current through the inductor 436 may follow either the current path 800 or the first current path 900 depending on a phase relationship between the current and voltage of the inductor 436 at a particular time.

Returning to act 508, if a voltage of the secondary winding 418 is not greater than a voltage of the capacitor 112 (508 NO), then the process 500 continues to act 516.

At act 516, power is exchanged between the capacitor 112 and the DC/AC inverter 108. At least because the first diode 420 and/or third diode 424 are reverse-biased, the DC/DC converter 104 may not provide power to the DC/AC inverter 108. However, the capacitor 112 may discharge stored energy to the DC/AC inverter 108, and/or the inductor 436 may discharge stored energy to the capacitor 112.

Act 516 may be executed between the first time 624 and the second time 626, for example. The inverter switches 430, 432 are closed to couple the DC/AC inverter 108 to the capacitor 112. The capacitor 112 may provide a voltage to the DC/AC inverter 108. Act 516 may include the capacitor 112 discharging stored power to the load 404 where a voltage across the inductor 436 is in phase with a current through the inductor 436, or may include the inductor 436 discharging stored power to the capacitor 112 where a voltage across the inductor 436 is not in phase with the current through the inductor 436.

Figure 10:
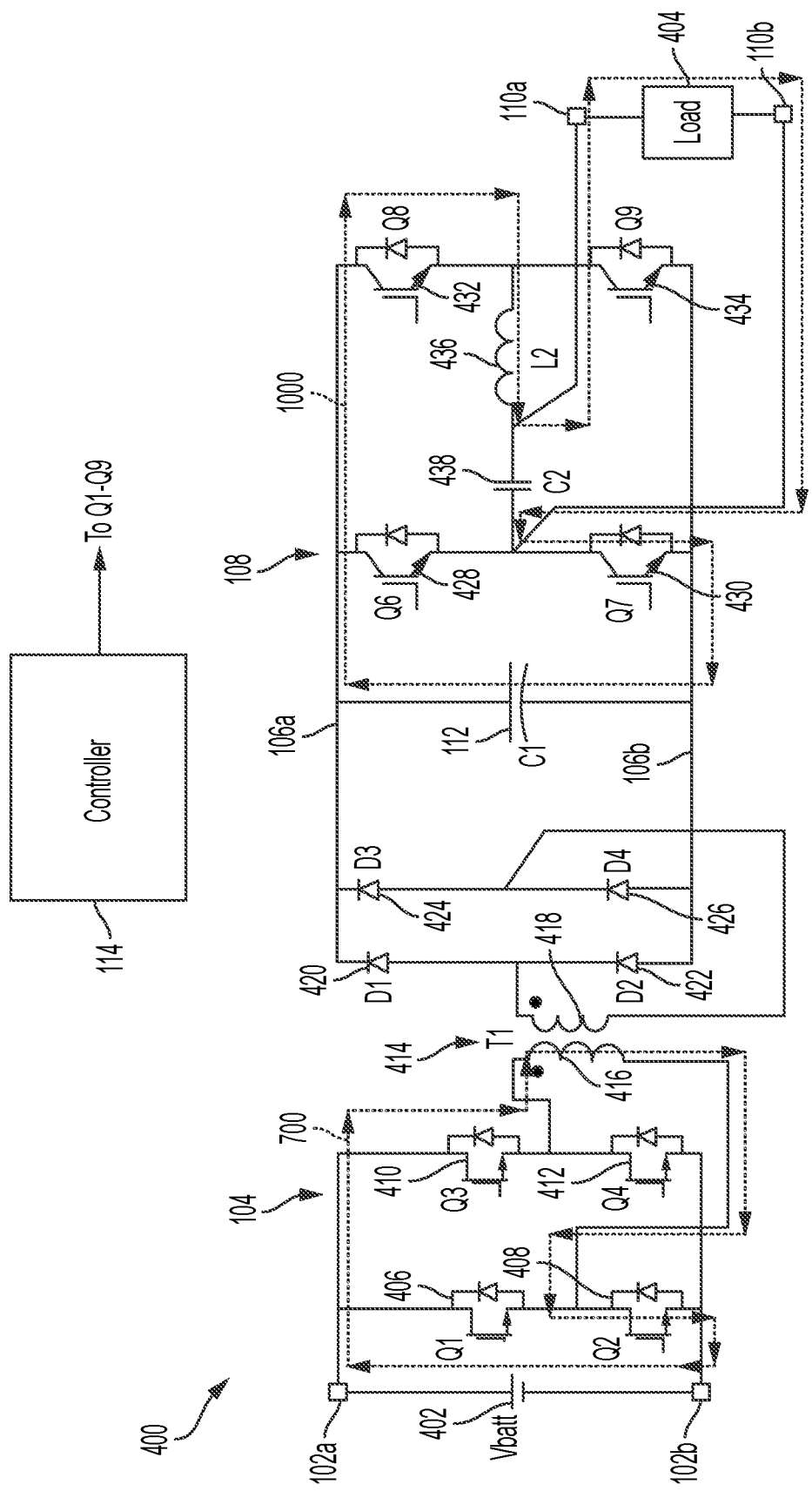
FIG. 10 illustrates a schematic diagram of the power-conversion system of FIG. 4 including a fourth current according to an example.

FIG. 10 illustrates a schematic diagram of the power-conversion system 400 in which a voltage across the inductor 436 is in phase with a current through the inductor 436, and the capacitor 112 discharges stored power to the inductor 436. A current path 1000 indicates a path of current discharged by the capacitor 112. As indicated by the current path 1000, a current discharged by the capacitor 112 passes through the third inverter switch 432, the inductor 436, the first AC output 110a, the load 404, the second AC output 110b, and the second inverter switch 430, and returns to the capacitor 112. The process 500 continues to act 512, and the DC/AC inverter 108 generates an AC output based on the power provided to the AC output 110 as discussed above.

Figure 11:
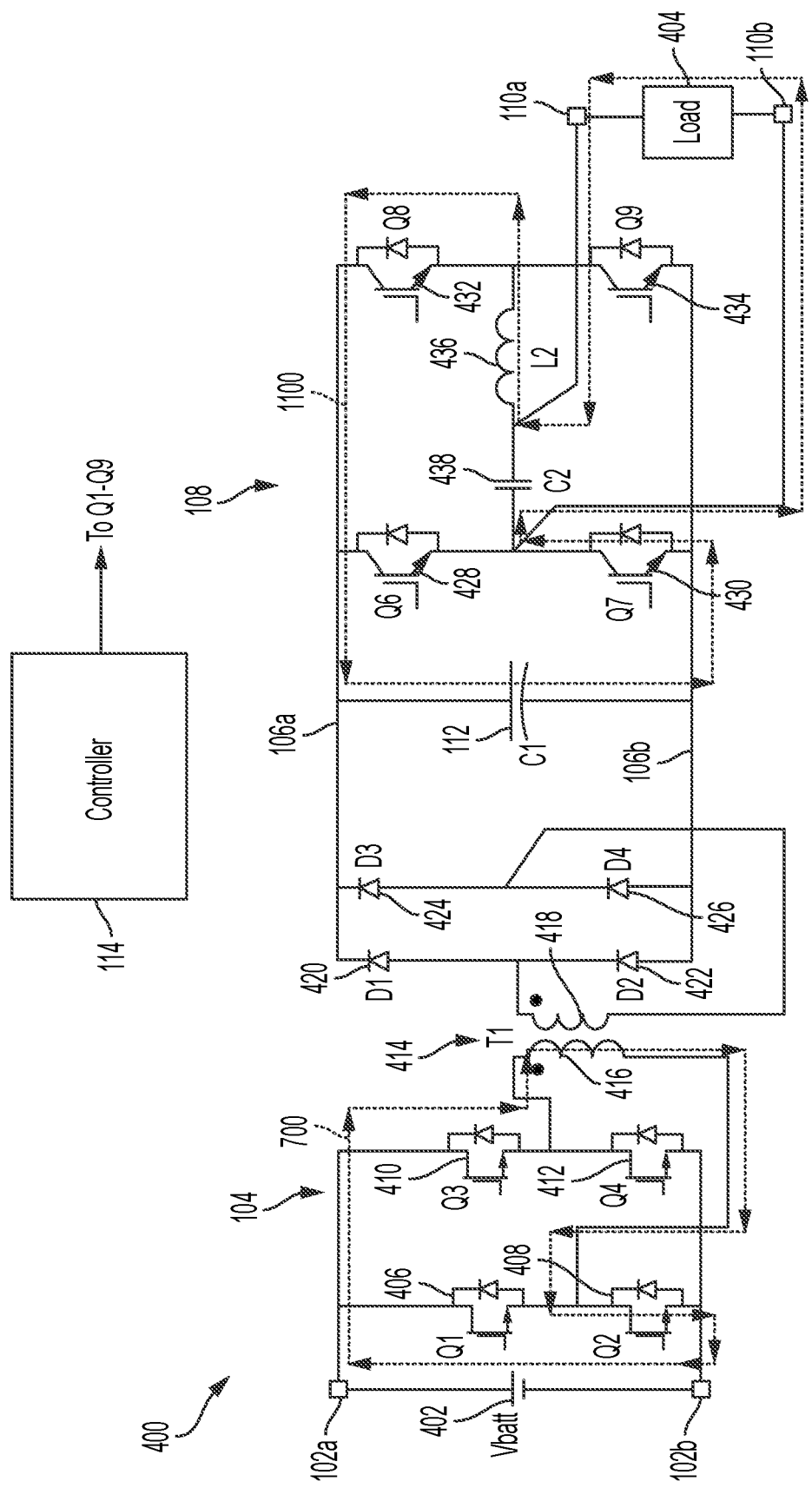
FIG. 11 illustrates a schematic diagram of the power-conversion system of FIG. 4 including a fifth current according to an example.

FIG. 11 illustrates a schematic diagram of the power-conversion system 400 in which a voltage across the inductor 436 is not in phase with a current through the inductor 436, and the inductor 436 therefore discharges stored power to the capacitor 112. A current path 1100 indicates a path of current discharged by the inductor 436. As indicated by the current path 1100, a current discharged by the inductor 436 passes through the third inverter switch 432, the capacitor 112, the second inverter switch 430, the second AC output 110b, the load 404, and the first AC output 110a, and returns to the inductor 436. The process 500 continues to act 512, and the DC/AC inverter 108 generates an AC output based on the power provided to the AC output 110 as discussed above.

Returning to act 504, if a determination is made to not draw DC power from the energy-storage device 402 (504 NO), then the process 500 continues to act 518. In various examples, power may be drawn from the energy-storage device 402 when the DC/AC inverter 108 is drawing power from the DC/DC converter 104. For example, the DC/AC inverter 108 may draw more power from the DC/DC converter 104 during higher-amplitude portions of an output AC waveform. When the DC/AC inverter 108 is not drawing power from the DC/DC converter 104, the DC/DC converter 104 may be controlled to not draw power from the energy-storage device 402 at least because the DC/DC converter 104 is synchronized with the DC/AC inverter 108. In various examples, the controller 114 may instead control the DC/DC converter 104 to discharge energy stored in the transformer 414 while not drawing power from the energy-storage device 402.

At act 518, the controller 114 controls the DC/DC converter 104 to discharge energy stored in the primary winding 416. Act 518 may include decoupling the primary winding 416 from the energy-storage device 402 and shorting the primary winding 416. More particularly, act 518 may include simultaneously closing the second converter switch 408 and the fourth inverter switch 412 or simultaneously closing the first converter switch 406 and the third converter switch 410. For example, between a fifth time 632 and a sixth time 634, the controller 114 may simultaneously close the second converter switch 408 and the fourth inverter switch 412, as indicated by the sixth control-signal trace 618 and the eighth control-signal trace 622.

Figure 12:
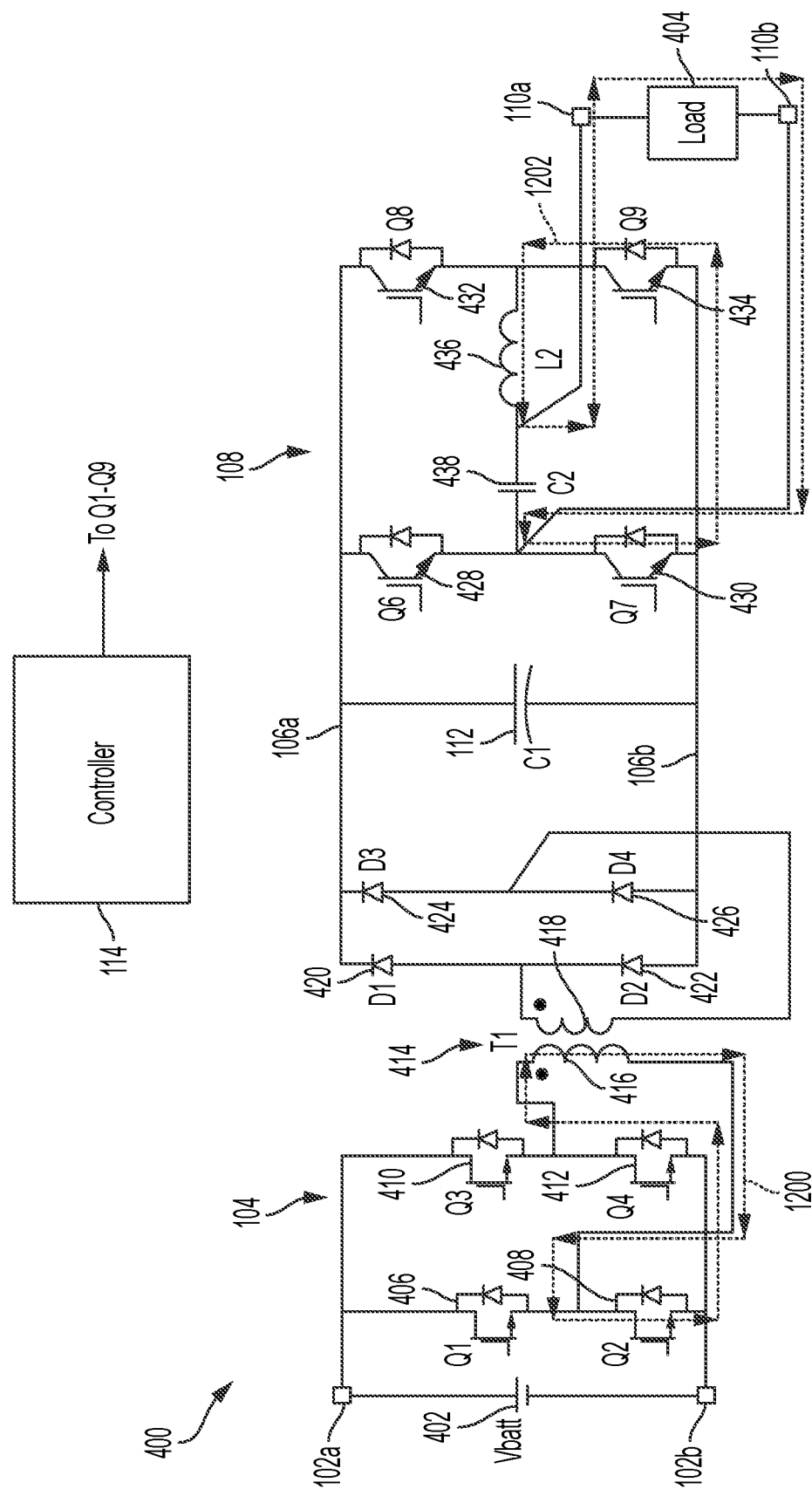
FIG. 12 illustrates a schematic diagram of the power-conversion system of FIG. 4 including a sixth current according to an example.

FIG. 12 illustrates a schematic diagram of the power-conversion system 400 in which the second converter switch 408, the fourth converter switch 412, the second inverter switch 430, and the fourth inverter switch 434 are closed, such as between the fifth time 632 and the sixth time 634. A first current path 1200 indicates a path of current discharged by the primary winding 416. As indicated by the current path 1200, the current is discharged by the primary winding 416 through the second converter switch 408 and the fourth converter switch 412, and returns to the primary winding 416. In other examples, act 518 may include simultaneously closing the converter switches 406, 410 to discharge the primary winding 416.

At act 520, the controller 114 controls the DC/AC inverter 108 to discharge energy stored in the inductor 436. Act 520 may include decoupling the DC/AC inverter 108 from the DC/DC converter 104 and coupling the inductor 436 to the load 404. More particularly, act 520 may include simultaneously closing the first inverter switch 428 and the third inverter switch 432 or simultaneously closing the second inverter switch 430 and the fourth inverter switch 434. For example, between the fifth time 632 and the sixth time 634, the controller 114 may simultaneously close the second inverter switch 430 and the fourth inverter switch 434, as indicated by the third control-signal trace 612 and the fourth control-signal trace 614.

FIG. 12 includes a second current path 1202 indicating a path of current discharged by the inductor 436 in a first example. As indicated by the current path 1202, the current is discharged by the inductor 436 to the first AC output 110a, the load 404, the second AC output 110b, the second inverter switch 430, and the fourth inverter switch 434. As discussed above, the inductor 436 may discharge bidirectionally and may therefore discharge current in an opposite direction of the first example of FIG. 12.

Figure 13:
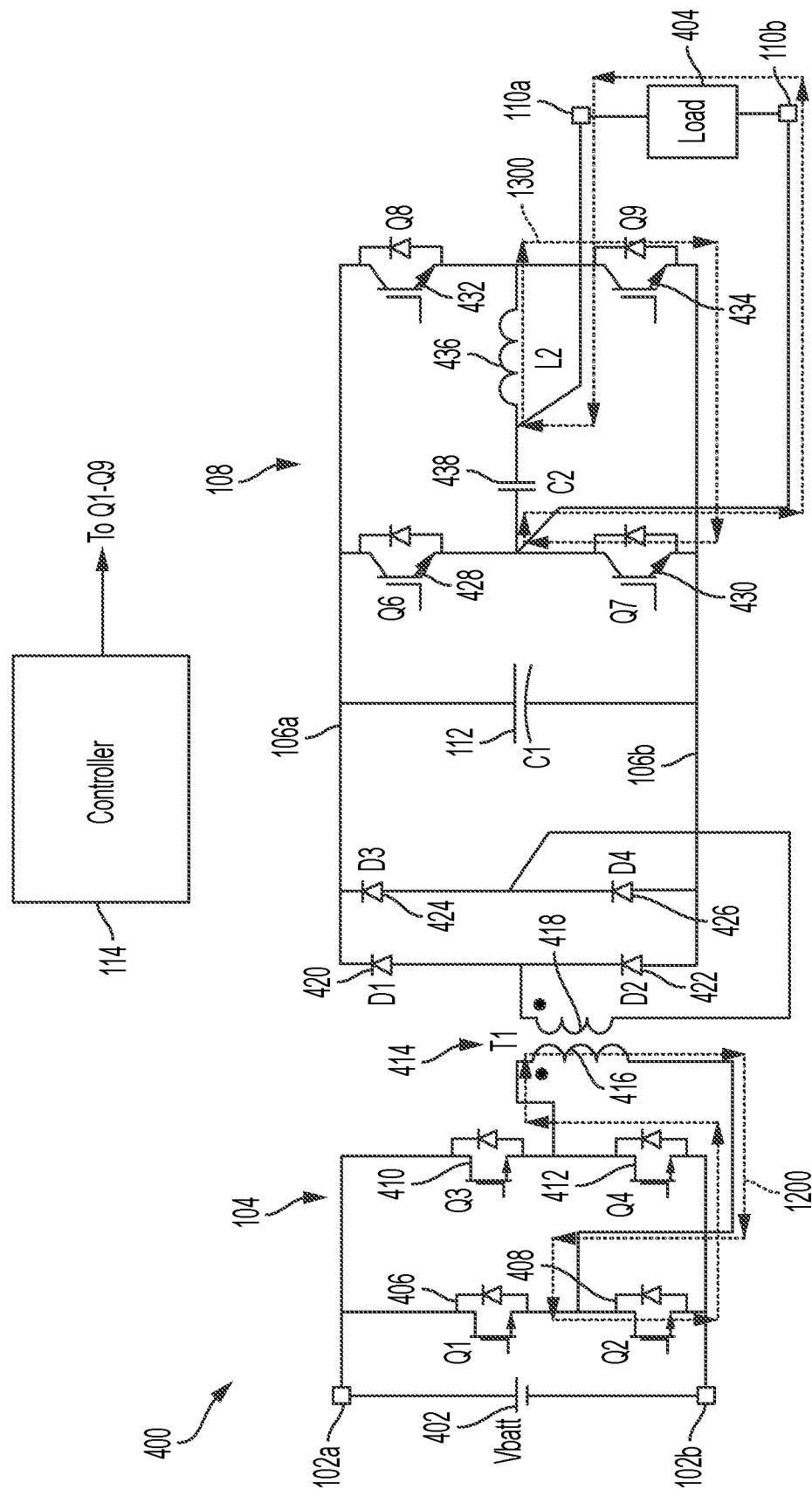
FIG. 13 illustrates a schematic diagram of the power-conversion system of FIG. 4 including a seventh current according to an example.

FIG. 13 illustrates a schematic diagram of the power-conversion system 400 in which the second converter switch 408, the fourth converter switch 412, the second inverter switch 430, and the fourth inverter switch 434 are closed, such as between the second time 626 and the fifth time 632. The current path 1200 indicates a path of a current discharged by the primary winding 416, as discussed above. A current path 1300 indicates a path of current discharged by the inductor 436 according to a second example. As indicated by the current path 1300, the current is discharged from the inductor 436 to the fourth inverter switch 434, the second inverter switch 430, the second AC output 110b, the load 404, and the first AC output 110a, and returns to the inductor 436. The process 500 then returns to act 504.

Accordingly, FIG. 6 provides a graph 600 illustrating a control scheme and control signals implemented by the controller 114, and FIG. 5 provides a process 500 indicative of the control scheme. Control of the DC/DC converter 104 is synchronized with control of the DC/AC inverter 108 at least in part by aligning control signals of the converter switches 406-412 with control signals of the inverter switches 428-434. For example, PWM signals are provided to the converter switches 406-412 as indicated by the traces 616-622, and the PWM signals are synchronized with the PWM signals provided to the inverter switches 428-434 as indicated by the traces 608-614.

As discussed above, the secondary winding 418 may provide power to the capacitor 112 to charge the capacitor 112. The secondary winding 418 may therefore stop charging the capacitor 112 when the capacitor 112 is charged to approximately a voltage of the secondary winding 418. However, the inductor 436 may discharge reactive power to the capacitor 112 as discussed above, which may charge the capacitor 112 to a voltage above a voltage of the secondary winding 418 as discussed above with respect to act 508. The capacitor 112 may later discharge the stored power to the inductor 436.

In some examples, the capacitor 112 has a capacitance of approximately 50 g. As used herein, "approximately 50 g" may include a capacitance between, for example, about 49.9 and about 50.1 g, between about 49 and about 51 g, between about 45 and about 55 µF, between about 40 and about 60 g, or other non-limiting examples. In some examples, the capacitor 112 is physically smaller and has a smaller capacitance than an existing DC-link capacitor. For example, whereas a DC-link capacitor may be implemented as an electrolytic capacitor, the capacitor 112 may be implemented as a film capacitor (for example, having a capacitance of approximately 50 µF) in some examples. In still other examples, the capacitor 112 may be omitted.

In some examples, the power-conversion systems 100, 400 are, or are implemented in, a UPS. In one example, the UPS may include a 230 V, 1000 VA UPS operating at a switching frequency of approximately 30 kHz and having a 230 V, 50 Hz AC output. The DC input 102 may be coupled to an energy-storage device, such as the energy-storage device 402, of various voltages. In one example, the energy-storage device 402 includes a 48 V battery. The transformer 414 may include a step-down or step-up transformer. In one example, the transformer 414 has a turns ratio of 2:17, is configured to receive an input voltage of approximately 48 V from the energy-storage device 402, and is configured to provide a voltage of approximately 400 V across the DC busses 106. The AC output 110 is configured to provide an output signal which may have any of several voltages or frequencies, such as a 230 V, 50 Hz output signal. In other examples, the power-conversion systems 100, 400 may be, or may be implemented in, power devices other than UPSs and/or UPS s having different operating parameters.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A power-conversion system comprising:
an input;
an output;
a DC/DC converter coupled to the input, wherein the DC/DC converter includes converter switches coupled to the input;
a DC/AC inverter coupled to the DC/DC converter and coupled to the output, wherein the DC/AC inverter includes inverter switches coupled to the output; and
at least one controller coupled to the DC/DC converter and the DC/AC inverter, the at least one controller being configured to
control the DC/DC converter based on a carrier signal having a carrier-signal frequency to draw input power from the input and provide converted power to the DC/AC inverter,
control the DC/AC inverter to receive the converted power and provide output power to the output in synchronization with the DC/DC converter drawing the input power from the input, wherein controlling the DC/AC inverter to provide the output power to the output in synchronization with the DC/DC converter drawing the input power from the input includes controlling the DC/AC inverter based on the carrier signal having the carrier-signal frequency,
control the DC/DC converter switches based on a comparison between a first reference signal and the carrier signal, and control the DC/AC inverter switches based on a comparison between a second reference signal and the carrier signal,
wherein the at least one controller is further configured to control the DC/DC converter switches to provide power to the DC/AC inverter switches in synchronization with controlling the DC/AC inverter switches to draw power from the DC/DC converter switches.

2. The power-conversion system of claim 1, wherein the at least one controller is further configured to control at least two converter switches of the converter switches and at least two inverter switches of the inverter switches to be in a closed and conducting position approximately simultaneously.

3. The power-conversion system of claim 1, wherein the DC/DC converter includes a transformer having a primary winding coupled to the converter switches and a secondary winding coupled to the inverter switches.

4. The power-conversion system of claim 3, wherein the at least one controller is further configured to
control at least two converter switches of the converter switches to conduct power from the input to the primary winding, and
control at least two inverter switches of the inverter switches to conduct power from the secondary winding to the output.

5. The power-conversion system of claim 1, further comprising:
a positive DC bus and a negative DC bus coupled between the DC/DC converter and the DC/AC inverter; and
a capacitor coupled between the positive DC bus and the negative DC bus.

6. The power-conversion system of claim 5, wherein the at least one controller is further configured to control the DC/AC inverter to receive the converted power directly from the DC/DC converter, bypassing the capacitor.

7. The power-conversion system of claim 5, wherein the capacitor has a capacitance of approximately 50 µF or less.

8. The power-conversion system of claim 5, further comprising an output inductor coupled to the capacitor via the DC/AC inverter and coupled to the output.

9. The power-conversion system of claim 8, wherein the at least one controller is further configured to control the DC/AC inverter to discharge the output inductor to the capacitor.

10. The power-conversion system of claim 8, wherein the at least one controller is further configured to control the DC/AC inverter to discharge the capacitor to the output inductor.

11. The power-conversion system of claim 1, wherein the first reference signal and the second reference signal have a same magnitude and a same frequency, and are phase-shifted by 180 degrees with respect to one another.

12. A non-transitory computer-readable medium storing thereon sequences of computer-executable instructions for operating a power-conversion system having an input, an output, a DC/DC converter coupled to the input, a DC/AC inverter coupled to the DC/DC converter and to the output, wherein the DC/DC converter includes converter switches coupled to the input, and wherein the DC/AC inverter includes inverter switches coupled to the output, the sequences of computer-executable instructions including instructions that instruct at least one processor to:
control the DC/DC converter based on a carrier signal having a carrier-signal frequency to draw input power from the input and provide converted power to the DC/AC inverter,
control the DC/AC inverter to receive the converted power and provide output power to the output in synchronization with the DC/DC converter drawing the input power from the input, wherein controlling the DC/AC inverter to provide the output power to the output in synchronization with the DC/DC converter drawing the input power from the input includes controlling the DC/AC inverter based on the carrier signal having the carrier-signal frequency,
control the DC/DC converter switches based on a comparison between a first reference signal and the carrier signal,
control the DC/AC inverter switches based on a comparison between a second reference signal and the carrier signal, and
control the DC/DC converter switches to provide power to the DC/AC inverter switches in synchronization with controlling the DC/AC inverter switches to draw power from the DC/DC converter switches.

13. The non-transitory computer-readable medium of claim 12, wherein the DC/DC converter includes at least two converter switches and the DC/AC inverter includes at least two inverter switches, and wherein the instructions further instruct at least one processor to:
control the at least two converter switches to provide power to the at least two inverter switches in synchronization with controlling the at least two inverter switches to draw power from the at least two converter switches.

14. The non-transitory computer-readable medium of claim 13, wherein the instructions further instruct at least one processor to control the at least two converter switches and the at least two inverter switches to be in a closed and conducting position approximately simultaneously.

15. The non-transitory computer-readable medium of claim 13, wherein the DC/DC converter includes a transformer having a primary winding and a secondary winding,
wherein controlling the at least two converter switches to provide power to the at least two inverter switches includes controlling the at least two converter switches to provide power to the primary winding, and
wherein controlling the at least two inverter switches to receive the converted power and provide output power to the output in synchronization with the DC/DC converter drawing the input power from the input includes controlling the at least two inverter switches to conduct power from the secondary winding to the output.

16. The non-transitory computer-readable medium of claim 12, wherein the power-conversion system further includes a positive DC bus and a negative DC bus coupled between the DC/DC converter and the DC/AC inverter, and a capacitor coupled between the positive DC bus and negative DC bus, and wherein the instructions further instruct at least one processor to control the DC/AC inverter to receive the converted power directly from the DC/DC converter, bypassing the capacitor.

17. The non-transitory computer-readable medium of claim 12, wherein the power-conversion system further includes a capacitor coupled to the DC/AC inverter and an output inductor coupled to the capacitor via the DC/AC inverter and to the output, wherein the instructions further instruct at least one processor to control the DC/AC inverter to discharge the output inductor to the capacitor.

18. The non-transitory computer-readable medium of claim 12, wherein the power-conversion system further includes a capacitor coupled to the DC/AC inverter and an output inductor coupled to the capacitor via the DC/AC inverter and to the output, wherein the instructions further instruct at least one processor to control the DC/AC inverter to discharge the capacitor to the output inductor.

19. A method of operating a power-conversion system having an input, an output, a DC/DC converter coupled to the input, a DC/AC inverter coupled to the DC/DC converter and to the output, wherein the DC/DC converter includes converter switches coupled to the input, and wherein the DC/AC inverter includes inverter switches coupled to the output, the method comprising:

controlling the DC/DC converter based on a carrier signal having a carrier-signal frequency to draw input power from the input and provide power to the DC/AC inverter;

controlling the DC/AC inverter to receive the converted power and provide output power to the output in synchronization with the DC/AC inverter drawing power from the DC/DC converter, wherein controlling the DC/AC inverter to receive the converted power and provide the output power to the output in synchronization with the DC/AC inverter drawing power from the DC/DC converter includes controlling the DC/AC inverter based on the carrier signal having the carrier-signal frequency;

controlling the DC/DC converter switches based on a comparison between a first reference signal and the carrier signal; and controlling the DC/AC inverter switches based on a comparison between a second reference signal and the carrier signal, wherein controlling the DC/DC converter switches to provide power to the DC/AC inverter switches is in synchronization with controlling the DC/AC inverter switches to draw power from the DC/DC converter switches.

* * * * *